United States Patent
Singhal

(10) Patent No.: US 10,068,118 B2
(45) Date of Patent: Sep. 4, 2018

(54) APPARATUS AND METHOD FOR A BIOMETRIC SENSOR IN A HANDHELD MOBILE WIRELESS COMMUNICATION DEVICE

(71) Applicant: Tara Chand Singhal, Torrance, CA (US)

(72) Inventor: Tara Chand Singhal, Torrance, CA (US)

( * ) Notice: Subject to any disclaimer, the term of this patent is extended or adjusted under 35 U.S.C. 154(b) by 0 days.

(21) Appl. No.: 14/263,179

(22) Filed: Apr. 28, 2014

(65) Prior Publication Data

US 2015/0242673 A1 Aug. 27, 2015

Related U.S. Application Data

(60) Provisional application No. 61/944,155, filed on Feb. 25, 2014.

(51) Int. Cl.
| | |
|---|---|
| *G06F 3/045* | (2006.01) |
| *G06K 9/00* | (2006.01) |
| *G06F 3/0488* | (2013.01) |
| *G06F 21/32* | (2013.01) |
| *G06F 3/044* | (2006.01) |

(52) U.S. Cl.
CPC ....... *G06K 9/00013* (2013.01); *G06F 3/0488* (2013.01); *G06F 21/32* (2013.01); *G06K 9/00912* (2013.01); *G06F 3/044* (2013.01); *G06F 2203/04104* (2013.01)

(58) Field of Classification Search
CPC . G06F 3/00; G06F 3/041; G06F 3/045; G06F 3/044; G06F 2203/04104; G06K 9/00013; G06K 9/001
See application file for complete search history.

(56) References Cited

U.S. PATENT DOCUMENTS

| | | | |
|---|---|---|---|
| 6,660,042 B1 | 12/2003 | Curcie | |
| 8,090,945 B2 | 1/2012 | Singhal | |
| 2010/0097324 A1 | 4/2010 | Anson et al. | |
| 2011/0115618 A1* | 5/2011 | Catten et al. | 340/439 |
| 2012/0182253 A1* | 7/2012 | Brosnan | 345/174 |
| 2012/0269406 A1* | 10/2012 | Kraemer et al. | 382/124 |
| 2013/0264384 A1* | 10/2013 | Wadia | 235/379 |

FOREIGN PATENT DOCUMENTS

WO WO2013/112964 A1 8/2013

OTHER PUBLICATIONS

International Search Report and Written Opinion of International Searching Authority, dated Jun. 18, 2015.

* cited by examiner

*Primary Examiner* — Mark Regn
(74) *Attorney, Agent, or Firm* — Steve Roeder, Esq.

(57) ABSTRACT

A smart phone device has a display screen overlaid by a touch screen and a processor and a memory in the device hosting functions to perform display and touch functions. A logic executing in the processor in the device programmed to use a part of the touch screen as a biometric sensor. The logic sets aside a space on the touch screen for that specific space to function as the biometric sensor. The biometric sensor configured to use and uses either a finger of the hand or a thumb and thus captures either a fingerprint or a separate and distinct thumbprint, where a fingerprint and a thumbprint are different biometric samples.

20 Claims, 15 Drawing Sheets

Capture Logic 18

Sub-logic 18A activated by a switch activation, marks and displays a pre-specified area via the display screen of the touch screen for capturing a fingerprint or thumbprint and displays instructions for use – place thumb flat anywhere on the specific marked area.

The logic 18A creates a collection timer waits for collection time expiration, during the time detects gross touch over at least a threshold area of the specified area, and activates a sub-logic 18B

Figure 2A

Capture Logic 18

Sub-logic 18B to begin capture of capacitor grid charge data matrix for the specific area and that collects a biometric sample.

Sub-logic 18C that (i) computes quality threshold indicator and annunciates good collection by light or beep or both annunciation in the device and (ii) creates a feature matrix from the charge data matrix.

sub-logic 18D, that compares the feature matrix with stored sample, makes a decision and conveys results to sub-logic E.

Figure 2B

Capture Logic 18

Sub-logic 18E unwinds logic 18A, 18B, 18C and 18D and launches device specific processing.

Sub-logic 18F that additionally requires input of a PIN using touch screen,

Sub-logic 18G that uses the PIN to create an encryption key, encrypts the biometric sample.

Sub-logic 18H that wirelessly transmits the encrypted sample along with a device identifier to a network device. The logic additionally includes in the wirelessly transmitted authentication record a GPS location data and a time of use from the device to the network device.

Capture Logic 18X scan the entire touch screen to detect area of gross touch for use as sensor area
and
determine boundary of the sensor area where the user has placed thumb/finger

Figure 2C

Customer Setup Function 46

- Select hand, left or right
- Select hand size, small, medium and large – optional
- Select thumb or index finger of the hand
- Select one or more of a sensor area choices displayed on the touch screen, where the sensor area has been pre-defined based on different ways, a smart phone device is held in the hand as well as positioning of finger or thumb for print capture
- Create a new sensor area that has not been pre-defined
- Display the sensor area for final selection
- Save the sensor area size and location for use in the capture logic 18.

Figure 4A

At step 30, building a touch sensor surface with a surface area having a length and width dimension that would accommodate at least a placement of a human thumb flat on the sensor surface.

At step 32, embedding the sensor surface in an electronic device with circuits and software having a capture logic therein to facilitate capture of a thumbprint from the sensor surface, wherein the thumbprint is different than a fingerprint for use as a biometric sample.

At step 34, making the sensor surface area larger in one dimension relative to another dimension to match a footprint of a human thumb.

At step 36, activating the capture logic only when a thumb placement on the sensor surface is detected by the electronic device.

At step 38, computing a quality of print logic in the capture logic has that verifies the thumbprint capture and signifies collection of a good print by a beep and or a light on the device.

At step 40, making a surface orientation of the sensor surface relative to the electronic device facilitates thumbprint capture when the electronic device is held in the hand.

At step 42, making the surface area is at least ¾" by 1" to accommodate a thumbprint size.

At step 44, making the sensor surface a part of a touch screen of a mobile wireless communication device;

At step 46, marking the part of the touch screen soft marked when the device is powered to indicate to a user the location of the sensor surface area for placing the thumb.

Figure 4B

Capture Logic 19

Incorporated herein by reference to US Application Serial Number 11/ 520,201 filed Sep 13, 2006 and now US Patent 8,090,945.

Figure 7

APPARATUS AND METHOD FOR A BIOMETRIC SENSOR IN A HANDHELD MOBILE WIRELESS COMMUNICATION DEVICE

CROSS REFERENCE

This application claims priority from Provisional Application Ser. No. 61/944,155, filed Feb. 25, 2014 of Tara Chand Singhal, "Apparatus and Method for a Thumbprint Sensor in a Handheld Mobile Wireless Communication Device". The application Ser. No. 61/944,155 is incorporated herein by reference.

FIELD OF THE INVENTION

A smart phone device has a display screen overlaid by a touch screen, a processor, and a memory in the device, and hosts functions to perform display and touch functions. A logic executing in the processor of the device is programmed to use a part of the touch screen as a biometric sensor.

BACKGROUND

Wireless mobile communication devices, also known as smart phones, have become very common and have been acquired and are carried in their personal possession by the masses due to their low cost, convenience, and functionality. These wireless devices come equipped with features such as speakerphone, camera and GPS location.

The screen of such a device has two different layers, one is the LCD layer made up of a grid of pixels or dots. The other is the touch screen layer made of a grid of capacitors. The touch screen layer is overlaid over the display screen layer. The first layer is used for display while the second layer is used for detecting touch inputs on the touch screen.

Lately there has been a fingerprint sensor called Touch ID from Apple, in lieu of or in addition to a PIN code for user identification for unlocking the device. Smart phone attributes are size and weight and hence the Touch ID was added without altering the form factor and it was added to the home button and made of the same size as the home button on the front side of the iPhone 5S.

Based on news items, Touch ID from Apple is composed of an 8×8 millimeter, 170-micron-thick capacitive sensor located just beneath the home button on the iPhone 5s.

Capacitive sensors are constructed from many different media, such as copper, Indium tin oxide (ITO) and printed ink. ITO allows the capacitive sensor to be up to 90% transparent (for one layer solutions, such as touch phone screens).

Projected capacitive touch (PCT) technology is a capacitive technology which allows more accurate and flexible operation, by etching the conductive layer. An X-Y grid is formed either by etching one layer to form a grid pattern of electrodes, or by etching two separate, perpendicular layers of conductive material with parallel lines or tracks to form the grid; comparable to the pixel grid found in many liquid crystal displays (LCD).

The greater resolution of PCT allows operation with no direct contact, such that the conducting layers can be coated with further protective insulating layers, and operate even under screen protectors, or behind weather and vandal-proof glass. Because the top layer of a PCT is glass, PCT is a more robust solution versus resistive touch technology. Depending on the implementation, an active or passive stylus can be used instead of or in addition to a finger.

There are two types of PCT: self capacitance, and mutual capacitance. Mutual capacitive sensors have a capacitor at each intersection of each row and each column. A 12-by-16 array, for example, would have 192 independent capacitors.

A voltage is applied to the rows or columns. Bringing a finger or conductive stylus near the surface of the sensor changes the local electric field which reduces the mutual capacitance. The capacitance change at every individual point on the grid can be measured to accurately determine the touch location by measuring the voltage in the other axis.

Mutual capacitance allows multi-touch operation where multiple fingers, palms or styli can be accurately tracked at the same time.

Apple's fingerprint sensor, Touch ID, is the flagship feature on the iPhone 5s. But it doesn't always work the way it should. Since the sensor's introduction last September, a growing number of issues have surfaced—including everything from phones that don't recognize when a finger is present to those that don't approve fingerprints they're supposed to approve.

What's going on here? While faulty software or hardware could be to blame in a few cases, the problem might also be the user. Determining the real culprit requires a closer look at how Apple's sensor technology really works.

Touch ID is composed of an 8×8 millimeter, 170-micron-thick capacitive sensor located just beneath the home button on the 5s. This is used to capture a 500-pixel-per-inch (ppi) resolution image of your fingerprint. The sensor can read pores, ridges, and valleys. It can identify arches, loops, and whorls. It can even recognize fingerprints oriented in any direction.

When the user places his/her finger or thumb on the sensor, it looks at the fingerprint pattern on the conductive sub-dermis layer of skin located underneath the dermis layer. It also measures the differences in conductivity between the tops of the ridges and the bottoms of the valleys in your prints in this layer. This is more accurate than looking at the dead surface of the skin alone, which is constantly changing and isn't conductive.

This capacitive sensor is made of raw silicon. As such, it tends to be very fragile and susceptible to performance problems caused by dust, moisture, and electrostatic discharge, or ESD. To protect and insulate the sensor, Apple layered laser-cut sapphire crystal on top of the silicon. It chose sapphire for a few reasons. The material is very clear, and it acts as a lens for your fingerprint. It's also hard (it scores a 9 on the Mohs scale of hardness), which means it's difficult to scratch. If the home button does get scraped or scuffed, the images sent to the Touch ID sensor will be flawed and it will cease to work properly.

What's more, a stainless steel ring encircles the button and acts as a capacitive touch switch, turning the actual touch sensor on and off when a finger is present so it doesn't eat up your iPhone's battery life.

After you register your fingerprint—a process known as enrolling—an encrypted mathematical representation of that information is stored on the device's A7 processor in what's called the "secure enclave." When the sensor captures an image, software algorithms determine whether the print is a match with the stored information or not. A match allows access to the home screen. A non-match won't.

There are obviously a few possible points of failure in this process, but it all hinges on first getting that robust fingerprint data. "Any good biometric has to start with a high-quality image," Integrated Biometrics' CEO Steve Thies told WIRED. His company makes a variety of compact fingerprint sensors that use a different method from Apple's Touch ID (electroluminescence and a thin film transistor) to read fingerprints.

Basically, the larger the sensor, the easier it is to pick up a more accurate representation of your full fingerprint because it's working with more data. This makes it easier for recognition algorithms to confirm that your fingerprint actually belongs to you. But a larger sensor also introduces two problems: cost, in the case of a capacitive scanner like Apple's, and thickness, in the case of another popular fingerprint technology, optical sensing. (You've probably used the latter at the DMV or gym.)

Based on what we've seen from Apple's patent applications, it's highly likely the company considered other implementations of a touch sensor. But ultimately, it opted for a smaller version that could more easily fit inside the home button.

Apple partially gets around the small sensor issue using the enrollment process, which includes rolling your finger around to try to capture every microscopic nook and cranny on your finger. Then, at least, it has a large source to pull from, even if it's only scanning a section of that each time you tap your finger.

Still, the less data you have from a fingerprint to process, the harder it is to get a match. Precise Biometrics COO Patrick Lindeberg offers a good analogy: If you have a picture of a face and you see only a small part of that picture—the eyes, or part of one eye—it will be hard to recognize if it is a friend, or someone you don't know. If you have the full face, it's easy to process. Seeing only a portion of a fingerprint sets higher and higher requirements on software algorithms, Lindeberg says.

Indeed, the more sensitive the algorithm (to get a more exact match), the more false-negatives (failed when it should have passed) are produced, which may frustrate a valid user, according to Kevin Luowitz, CTO of biometric identity service startup CLEAR. "The challenge is then to find that happy balance of acceptable false-negatives and false-positives and user experience," Luowitz says. For security's sake, you would want the algorithm to veer towards false-negatives rather than false-positives.

Apple's Touch ID algorithm is designed to learn and improve over time—with each scan, it checks if it is a better reading than what is stored, and can update the master data for your print this way. This algorithm could certainly be changed or improved through iOS updates, as well. User error, and a lack of knowledge about biometrics and how they work, could also be causing some people's issues with Touch ID. "A lot of us in the industry, we are very impressed by the job Apple has done with Touch ID," Lindeberg said. "But on the consumer side, a lot of people have never used biometrics at all."

There are a variety of small things that could be going on to interrupt a successful Touch ID experience. First, for it to work properly, your finger needs to make contact not just with the sapphire of the home button, but also the stainless steel ring surrounding it. Next, the sensor itself works by measuring electrical differences between the ridges and valleys of your fingerprints. If your hands are too dry, it's going to be difficult for your print to be recognized (this could be a growing problem in the dry winter months ahead). Conversely, if your fingers are too moist or oily, recognition can also fail, as those valleys get filled. If the button gets dirty, as it likely will over time, you'll also want to clean it to keep Touch ID working properly. Apple suggests using a clean, lint-free cloth.

But what about that touch sensor itself? Some have worried that, like traditional capacitive-based fingerprint sensors, it will degrade over time. Thies of Integrated Biometrics thinks that as long as the sapphire crystal and metal ring are not damaged and are properly sealed, the sensor should last the life of the phone. Capacitive sensors in the past were unprotected, or covered in a very thin layer of carbon, and thus were very fragile.

For those experiencing Touch ID issues that cause their phone to freeze, or to not work as well over time, restarting the phone or recalibrating the sensor are your best bets. And if you're new to Touch ID or having trouble, Apple also has a guide you can reference for help.

Fingerprint sensors may not be a new technology. But Touch ID is certainly a new implementation of it. It's bound to experience some bumps as Apple tweaks its algorithms, and as users get accustomed to using biometrics on a daily basis. At the very least, by understanding how it works and the inherent pitfalls of fingerprint sensors, we can help minimize those issues ourselves.

Samsung is a direct competitor of Apple in the smart phone marketplace and has incorporated a fingerprint sensor in their oval-rectangle shaped home button, albeit using a prior art technology of optical sensor and not using the technology of mutual capacitance.

One last addition to the Samsung Galaxy S5 was the fingerprint scanner embedded in the home button. For half a day I used my fingerprint as a password, but soon disabled it after a couple frustrating bouts of trying to swipe my finger at the exact angle and speed that the S5 required. Also, the fingerprint scanner forces the S5 into being a two-hand device when most of the time, one will do.

Hence, it is the objective of the embodiments herein to have a different type of touch fingerprint sensor that may not have the issues as have been outlined above. Yet another objective is to take a different approach to the issue of a biometric sensor in the smart phone device. Yet another objective is to add more features in the smart phone devices making them even more convenient

SUMMARY

Smart phone and smart phone-like devices, such as tablet computers have become very common and are being used by the masses. Different embodiments of a fingerprint sensor and a thumbprint sensor that use the touch screen of the smart phone itself as a sensor for capturing a fingerprint, in lieu of a hardware sensor, as in Apple iPhone 5S and as also in Samsung Galaxy S5, are described.

In one series of these embodiments the technology of U.S. application Ser. No. 11/520,201 filed Sep. 13, 2006 and now U.S. Pat. No. 8,090,945, for a thumbprint sensor in a remote user authentication card-device, is implemented in a smart phone device because a modern smart phone already comes equipped with some of the features of this prior art remote user authentication card-device of application Ser. No. 11/520,201 in having a GPS sensor, a time clock, a data entry device for entering PIN, and a short distance wireless interface.

In this series of embodiments, the touch screen of the smart phone is adapted to function as a thumbprint sensor of the card-device of U.S. application Ser. No. 11/520,201 as described later herein, where the logic of the card-device of U.S. application Ser. No. 11/520,201 is incorporated in the smart phone. Thus this series of embodiments provide a smart phone with all the features that would enable a smart phone to function similar to as a remote user authentication card-device of application Ser. No. 11/520,201.

As had been described in the application Ser. No. 11/520,201, in this series of embodiments, the personal data of the user including a PIN and the thumbprint is not retained or stored in the smart phone, thus providing a degree of privacy and security assurance to a user.

In this series of embodiments, the print capture logic in the smart phone device may be customized to capture and send to the network as part of an authentication record, multiple factors of remote user authentication. The authentication record as a biometric factor may have, a thumbprint of a left hand or a right hand, an index fingerprint of either a left hand or a right hand, based on user selection and or convenience; it being understood that the back-end authentication logic operating in the network stores similar prints for authentication.

In another series of these embodiments, the captured print is stored in the smart phone device itself and use of such a fingerprint capture functions more or less like the prior art Touch ID of Apple. However, in this series of embodiments, the touch screen of the smart phone is adapted to function as a thumbprint or a fingerprint sensor as described later herein, obviating the need for a separate hardware sensor as in prior art devices such as, Apple iPhone 5S and Samsung Galaxy S5.

Further, in this series of embodiments, the captured print, using a one-way function that is unique to a smart phone device, is stored as a feature matrix in the smart phone device. The technology itself or algorithms for deriving a feature matrix from a print sample is prior art and is used by the FBI, when comparing a single print sample against a large database of stored prints.

The use of the one-way function in the embodiments herein assures that those who have access to the feature matrix from the smart phone device cannot re-create the original thumb or fingerprint nor use the feature matrix in another device or application.

The one-way function may use unique parameters of a particular smart phone and these may include some combination of hardware machine identification of the smart phone device, so that the captured print stored in the smart phone device in the form of a one-way hashed unique feature-matrix cannot be compromised by hackers or provide a potential of hacking.

One-way function coupled with a print feature matrix function, described as above, provides a degree of privacy and security assurance to a user in not having the risk of having their personal biometric data compromised. And thus facilitate use of such biometric sample in many more applications for authentication using the smart phone device.

In general the art of one-way function is prior art and used in information-security industry in creating a digital ID. The concept of the one-way function, as has been used in the information security industry, is adapted for the embodiments herein.

In this series of embodiments also, the print capture logic may be customized to capture a thumbprint of a left hand or a right hand, an index fingerprint of either a left hand or a right hand, including some or all combination of these prints, based on user selection and or convenience; it being understood that a compare logic in the device stores similar prints for authentication, in the smart phone device.

In both of these series of embodiments, a customer setup feature enables the user to decide and then set up how the fingerprint or the thumbprint would be captured by the touch screen of the smart phone. The setup feature may enable the user to decide, use of a finger, thumb or both, size, location, orientation of print on the touch screen, ability to make that size and location fixed or changeable, and whether to use a left hand or a right hand finger or thumb.

These and other aspects of the embodiments herein are further described in detail with the help of the accompanying drawings and the description.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIGS. 2A, 2B and 2C are block diagram that illustrates features of capture logic of preferred embodiment of a biometric sensor;

FIG. 4A is a diagram that illustrates features of a customer setup function of the embodiments herein for a smart phone biometric sensor;

FIG. 4B is a method diagram that illustrates features of the embodiments herein of a smart phone biometric sensor;

FIG. 7 is a diagram that illustrates features of capture logic for remote user authentication for a wireless network of the embodiments herein of a smart phone biometric sensor;

DESCRIPTION

Figure 1:
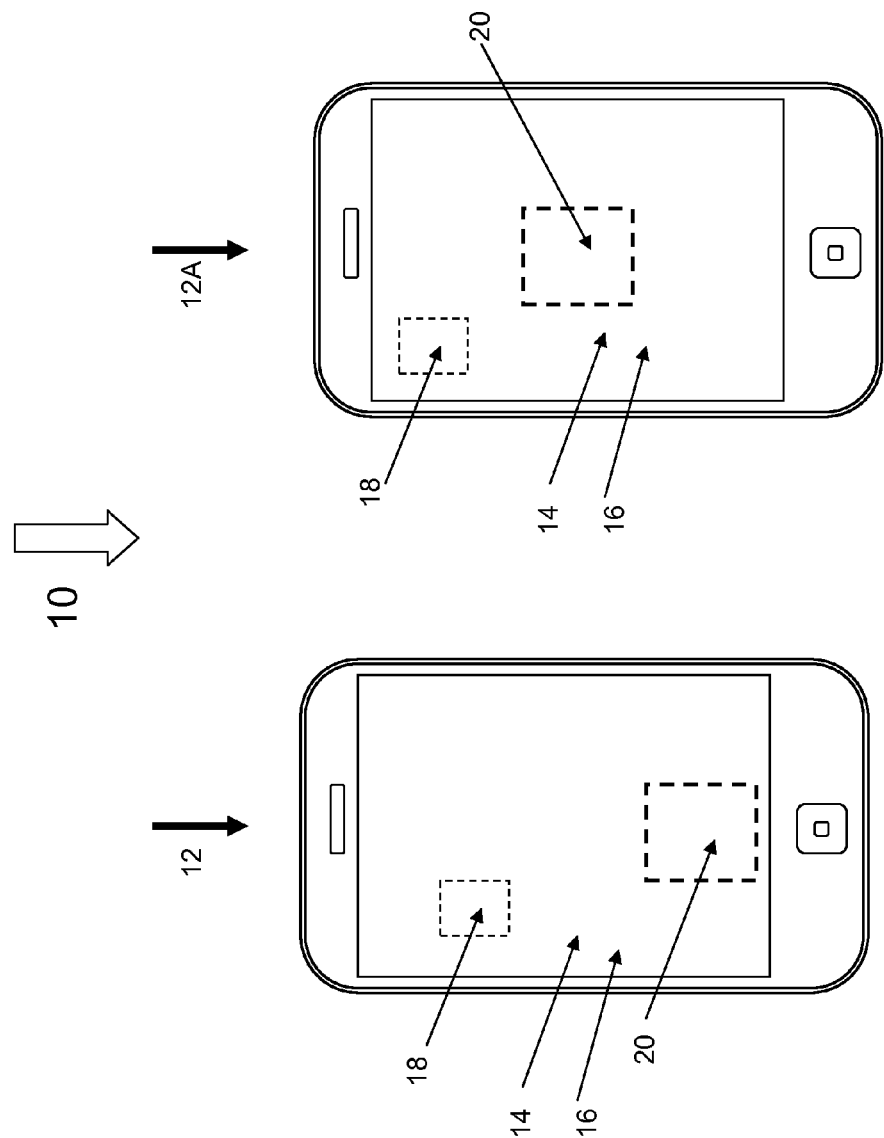
FIG. 1 is a block diagram that illustrates features of a biometric sensor in a mobile wireless communication device.

Introduction:

In a smart phone device, size, weight, and form-factor are premium issues for a handheld device. That is, perhaps why the iPhone 5S model from Apple has positioned the biometric sensor named Touch ID on the tiny circular shaped home button of the smart phone device itself.

Samsung followed suit by placing their biometric sensor for a fingerprint sensor on their device also on the home button itself. The Samsung home button is rectangular-oval shaped and the finger tip needs to be slid across the button surface, which it is believed captures the fingerprint optically, as different from Apple iPhone 5S which captures using mutual capacitance technology.

A biometric sensor using a fingerprint sensor as part of user authentication is very common in the information security industry. Such a biometric sensor requires either the finger tip to be slid across the sensor or just placed on the sensor.

Even though in the information-security industry and for users themselves "thumbprint" and "fingerprint" are terms that are sometimes used interchangeably, however the biometric sensor industry only makes fingerprint sensors that are suitable for capturing a fingerprint because the fingerprint sensors are made in size that are suitable for a finger. That is, such fingerprint sensors are in width equal to a width of an index finger and are notionally about 1 centimeter wide.

For those sensors where the finger tip is slid across the sensor surface, the height of the sensor is notionally 3 to 4 mm. For those sensors where the finger tip is placed on top of the sensor surface, the height of the sensor is notionally 8 to 12 mm.

Given these sizes of sensor surface it is clear that the biometric sensor industry is making fingerprint sensors and not thumbprint sensors, even though there is no inherent limitation in the sensor itself and a fingerprint sensor is also capable of capturing a thumbprint from a thumb, but is neither designed nor intended to capture a thumbprint given the different sizes of these prints and the orientation of an index finger and a thumb in a human hand.

A recent example of such a sensor that requires a finger or a thumb to be positioned on the sensor is in the iPhone model 5S. Further the 5S sensor has been overlaid over the home button to save space as almost the entire surface of the device is used by a display and touch screen surface.

It is believed that a hardware fingerprint sensor, in general, and Apple Touch ID and a similar one in Samsung smart phone devices would have some drawbacks and a thumbprint sensor for a thumb or a fingerprint sensor for a finger, using the touch screen of the smart phone device, would have advantages over a hardware fingerprint sensor as in Apple iPhone 5S or as in Samsung Galaxy S5.

These advantages are apparent based on how a handheld device is held in the hand and gripped in the hand as well as how the device is used when held in the hand. As one illustration, if the device is held cradled in the palm supported by fingers, then it is the thumb of the same hand that can be used to access the surface of the device for operational control and not the index finger of that same hand.

The biometric industry uses the terms thumbprint and fingerprint sensor interchangeably to equate to a biometric sensor, as a fingerprint sensor could also collect a thumbprint as does the Apple Touch ID. In reality the two are very different as the print size of an index finger and the print size of a thumb are of different sizes and dimensions and are on part of the hand where the finger and a thumb have entirely different orientations relative to the hand and the palm of the hand.

A thumbprint is larger in size than a fingerprint and has more features to capture and create a more reliable biometric sample. In a human hand, an index finger and a thumb have different sizes and different orientations. Typically a fingerprint sensor is notionally one centimeter wide and also same amount in height. A thumbprint sensor would have a larger sensor surface to accommodate the area of a thumb surface. A thumbprint sensor based on a size of a thumb in a human hand notionally would be ¾ inch wide and 1.25 inch in height to accommodate a thumbprint when a thumb is positioned flat on a surface.

The technology of the touch screens has greatly advanced, in the last few years since the advent of the smart phone devices, for example in the modern devices that enable multiple touch control. The touch screens used in modern smart phone devices use a mutual capacitance based touch screen where a grid of capacitors is used to sense human finger touch on the screen. The resolution of the touch screen is quoted as ppi or pixels per inch. In essence the pixel in the touch screen is a capacitor. In modern touch screens the ppi is around 252 ppi.

Recently in model iPhone 5S, Apple has added a touch sensor called Touch ID which is overlaid over the home button switch to save space, as the space is limited. Touch ID is composed of an 8×8 millimeter, 170-micron-thick capacitive sensor located just beneath the home button on the 5s. This is used to capture a 500-pixel-per-inch (ppi) resolution image of your fingerprint. The sensor can read pores, ridges, and valleys. It can identify arches, loops, and whorls. It can even recognize fingerprints oriented in any direction.

When one places their finger or thumb on the sensor, it looks at the fingerprint pattern on the conductive sub-dermis layer of skin located underneath the dermis layer. It also measures the differences in conductivity between the tops of the ridges and the bottoms of the valleys in your prints in this layer. This is more accurate than looking at the dead surface of the skin alone, which is constantly changing and isn't conductive.

It is believed that the touch screen itself of a smart phone device may also be used as a capacitive touch sensor to capture a thumbprint or a fingerprint. It should be noted that the resolution of the touch screen is 252 ppi, whereas the resolution of the Apple Touch ID is 500 ppi. It is believed that either the 252 ppi is adequate for the needed resolution of the captured print as having a much larger print capture area or the captured print with this resolution may be interpolated to create a print capture that would be more than 252 ppi and may be 326 ppi or 504 ppi based on interpolation used.

The embodiments herein disclose how a part of the touch screen may be used as a fingerprint sensor and/or as a thumbprint sensor without the need for a separate hardware sensor such as an Apple type Touch ID sensor. It is also believed that a thumbprint due to its size is superior to a fingerprint and the embodiments herein disclose how the existing touch screen may be used as a thumbprint sensor. It is also believed, a thumbprint is better than a fingerprint for better/reliable quality of print capture as well as easier collection aspects.

Touch screen surface of a smart phone device is a capacitive element grid that can sense change in capacitance at each grid element independently of each other. The capacitive grid has as many elements as the display grid and thus is able to capture a capacitor charge at each element as precisely as a photo-like image of the thumbprint.

It is believed that the touch surface of the touch screen in smart phone devices using the technology of mutual capacitance is of a quality that when a thumb is placed flat on the capacitive touch surface, the capacitive grid elements would individually collect charge based on creating a visual image of a thumbprint. That is, the capacitive charge in each grid element is proportional to the features of a touch on the touch screen surface.

As has been noted above, the Apple Touch ID has 500 ppi whereas the touch screen has 252 ppi. To address this issue for an adequate print quality capture, either the touch screen resolution may be increased or the data collected from the 252 ppi touch screen may be interpolated to 504 ppi.

Interpolation for such applications is prior art where the value of the energy or the charge in proximate pixel locations are interpolated to create a value for an intermediate assumed pixel location. That is an actual charge collection for 252 pixels per inch may be interpolated to create a 376 or even a 504 pixel/inch image quality.

Thus a touch screen of a smart phone and like device may be able to function as an adequate fingerprint sensor that provides adequate size for an adequate print. The embodiments herein describe a print capture logic for either a thumb or a finger using the touch screen of a smart phone device.

A logic executing in the device processor is programmed with capture logic to use a part of the touch screen as a biometric sensor. The logic sets aside a space on the touch screen for that specific space to function as the biometric sensor. The set aside space is programmable to address needs of different users in how they hold and use the device. The biometric sensor is configured to use and uses either a finger of the hand or a thumb and thus captures either a fingerprint or a separate and distinct thumbprint, where a fingerprint and a thumbprint are different biometric samples.

That would obviate the need for a separate biometric sensor and let the touch screen be used for that purpose. Embodiments herein also teach a thumbprint sensor and not a fingerprint sensor and a thumbprint sensor that uses the touch screen itself of the device.

Print Capture Logic 18

The print capture logic is described with the help of FIGS. 1, 2A, 2B and 2C. As illustrated in FIG. 1, a wireless mobile communication device 10 is shown with a front view 12. The device 10 has a display screen 14 overlaid by a touch screen 16 and a processor and a memory in the device (not shown) hosting functions to perform display and touch control functions.

The touch screen 16 has a grid of capacitive elements and uses a mutual capacitance technology that detects multiple touch points on the touch screen using fingers. This type of technology is prior art and is commonly used in smart phones such as, Apple's iPhone 5s, among other smart phones.

Capture logic 18 is resident in the memory and the processor of the device 10. The capture logic 18 is programmed to use a part of the touch screen 16 as a biometric fingerprint sensor to collect a biometric sample.

The capture logic 18 sets aside a space 20 on the touch screen 16 for that specific space to function as the biometric sensor. As in FIG. 12A, the space 20 may be set aside in a different part of the touch screen 16 and may be moved or repositioned and resized based on user preference. The space 20 is marked or delineated by temporary markings via the display screen 14. Alternatively the space 20 may be marked differently.

The biometric sensor is configured to use and uses either a finger of the hand or a thumb and thus captures either a fingerprint or a separate and distinct thumbprint, where a fingerprint and a thumbprint are different biometric samples.

As illustrated in FIG. 2A, the capture logic 18 has a sub-logic 18A that is activated by a switch activation of the device and marks and displays a pre-specified area 20 via the display screen 14 underneath the touch screen 16 for capturing a fingerprint and also displays instructions for use—"place thumb flat anywhere on the specific marked area". The switch activation may be via touch as in launching an app or via a mechanical switch on the body of the device.

The logic 18A creates a collection timer, waits for collection time expiration, and during the time detects gross touch over at least a threshold area of the specified area, and activates a sub-logic 18B (FIG. 2B) to begin capture of capacitor grid charge data matrix for the specific area and collects a biometric sample.

The capture logic 18 has sub-logic 18C that (i) computes a quality threshold indicator and annunciates good collection by light or beep or both type of annunciation in the device, and (ii) creates a print feature matrix from the charge data matrix.

The logic 18 has a sub-logic 18D (FIG. 2B), that compares the feature matrix with stored sample, makes a pass/fail decision and conveys results to sub-logic 18E (FIG. 2C). A sub-logic 18E unwinds logic 18A, 18B, 18C and 18D and launches device specific processing.

The logic 18 may also have sub-logic 18F that additionally requires input of a PIN using touch screen, and a sub-logic 18G that uses the PIN to create an encryption key, encrypts the biometric sample and sub-logic 18H that wirelessly transmits the encrypted sample along with a device identifier to a network device. The logic may additionally include in the wirelessly transmitted authentication record a GPS location data and a time of use from the device to the network device.

Print Capture Logic 18X

With reference to FIG. 2C, print capture sub-logic 18X, in addition to sub-logic 18A may be used. The sub-logic 18X scans the entire touch screen 16 surface to detect area of gross touch for use as sensor area and determines a boundary of the sensor area where the user has placed his/her thumb/finger.

Using logic 18X in lieu of pre-identifying a sensor area on the smart phone device screen as in sub-logic 18A, enable a user the flexibility to place their thumb wherever they like, when they are holding the device in the same hand.

Biometric Sensor Space 20

As had been illustrated in FIG. 1, a wireless mobile communication device 10 is shown with a front side view 12. The device 10 has a display screen 14 overlaid by a touch screen 16 and a processor and a memory in the device (not shown) hosting functions to perform display and touch control functions.

With reference to FIG. 1, as shown in view 12, the thumbprint sensor device 10 has a touch sense surface area 20 on the touch screen 16. As shown in view 12A, the sensor area 20 is positioned on a different part of the touch screen 16.

The sensor surface 20 has a height and width dimension that would accommodate at least a placement of a human thumb flat on the sensor surface and alternatively placement of an index finger.

The index finger and a thumb are not only of different size in width and length but they are oriented at different angles in the human hand. Further, the hands and thus the index finger and thumb of individual users are different in size in general as well as different in size among male and female gender.

Figure 3A:
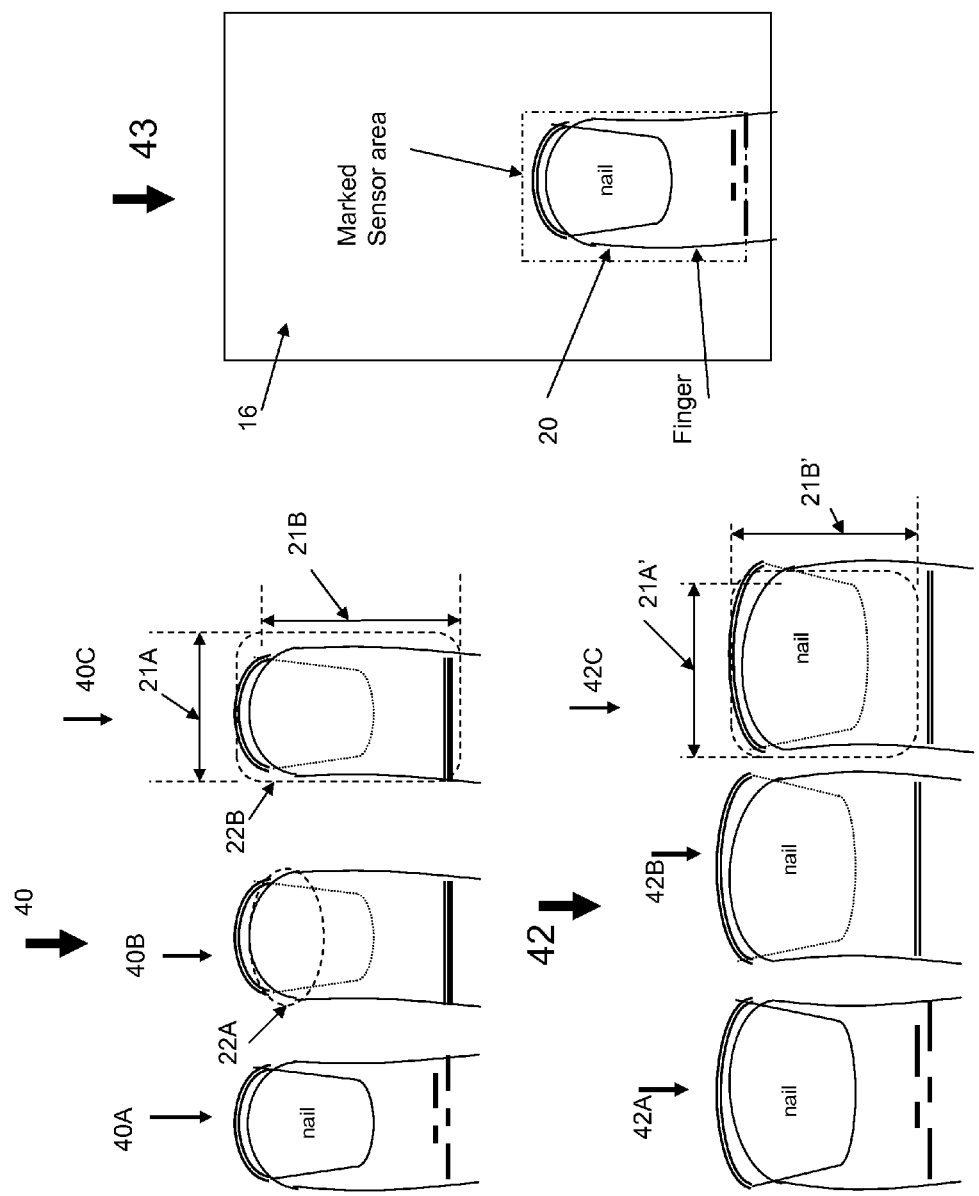
FIGS. 3A and 3B are diagrams that illustrate features of the embodiments herein of a smart phone biometric sensor.

With reference to FIG. 3A, view 40 shows an index finger area size and view 42 shows a thumb area size. In view 40, back side 40A, front side 40B and dimensions 40C of a finger are illustrated. As illustrated in view 40C, notionally the area size of an index finger is about ⅝" wide 21A and about 1.25" in height 21B.

When a fingerprint sensor of Apple and Samsung smart phone devices, positioned on the home button of these devices, is used for a fingerprint, it is believed, the finger tip area 22A as marked in view 40B is used. In contrast when using a fingerprint sensor of the embodiments herein using a touch screen of the device, the fingerprint area 22B is captured.

View 42 shows a thumb area size. In view 42, back side 42A of a thumb, front side 42B of a thumb and dimensions of the thumb 42C are illustrated. As illustrated in view 42C, notionally the thumbprint size 21A' of a thumb is notionally 0.75" wide and notionally 1.25" in height 21B'.

What have been illustrated above are notional dimensions that would depend on the male or female hand and also on different hand sizes between small, medium and large.

The prior art sensor as has been used in the prior art smart phones is limited in size to the size of the home button switch and thus while capturing a print, does not capture a complete print either of a finger or of a thumb.

As shown in view 40, view 40B shows the area of the finger tip 22A that would be accommodated by these prior art sensors. These sensors would not accommodate a thumb size print. Therefore the embodiments herein that use a touch screen of a device not only enable capture of a complete print of either the index finger or the thumb, but also make such a collection easier as illustrated later herein with the help of FIG. 3B.

As illustrated in FIG. 3A, the prior art fingerprint sensor provides for a limited area of print collection that is restricted to a tip of a finger 22A and a thumb. In contrast, the sensor space 20 of the embodiments here provide for a larger sensor area 20 for print that is sized to a finger or a thumb and also sized to individual users based on their physique and gender.

The surface area 20 provides for a better collection of a print as it is a larger area and thus provides a complete print with more features. The print area is sized to a specific user, the area is marked and may provide for alignment guides for the finger or the thumb, and the orientation of the area 20 on the touch screen 16 provides for an easier collection.

As further illustrated in view 43, space 20 is shown near the bottom of the touch screen 16 where a finger of the hand that is not holding the device may be placed by the user.

Figure 3B:
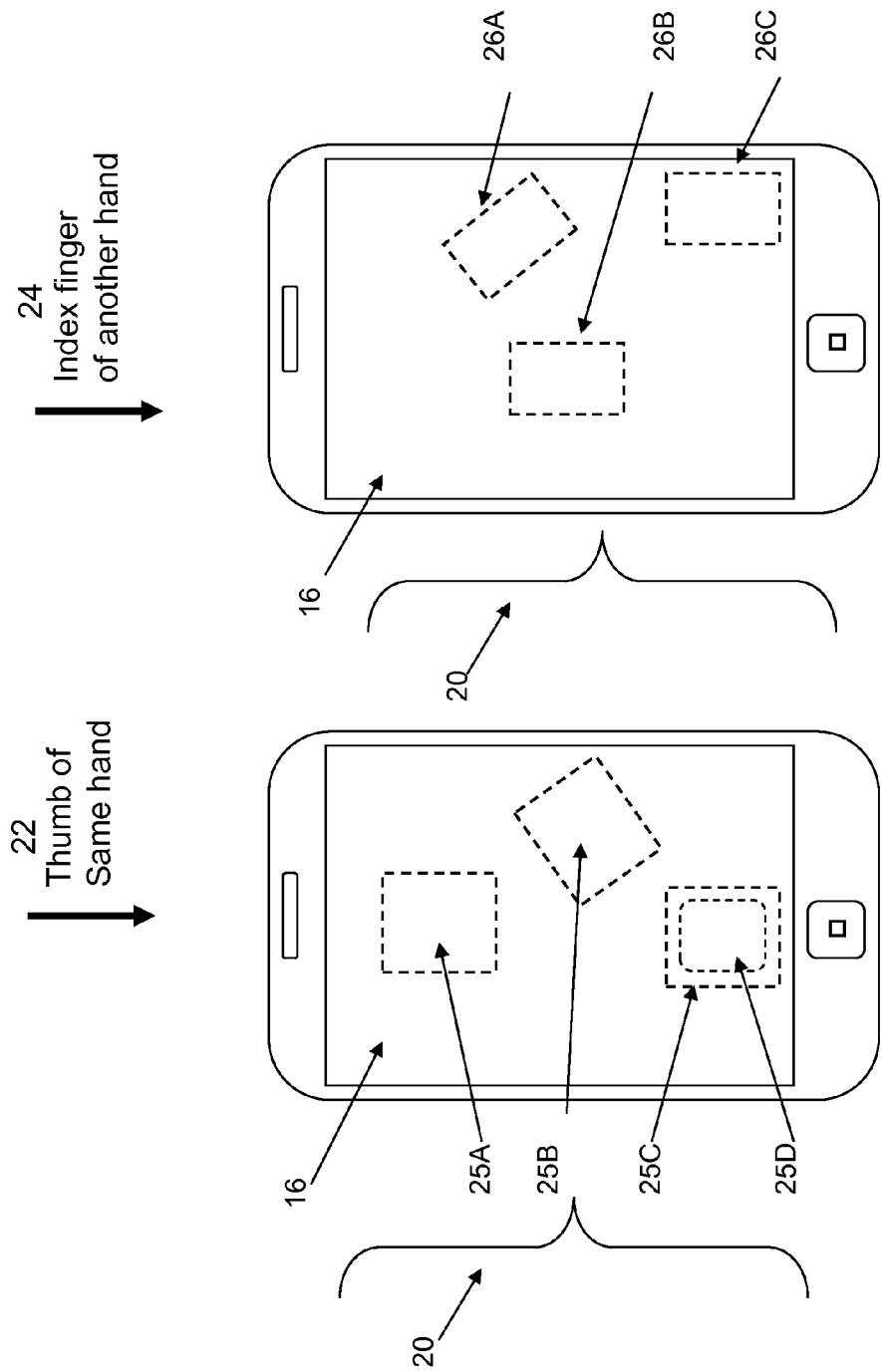

With reference to FIG. 3B, use of the touch sensor device for a finger and a thumb is illustrated. View 22 illustrates use a thumbprint from a thumb of the same hand that is holding the device, while view 24 illustrates use of the touch sensor for a index finger of the other hand.

As shown in view 22, the space 20 is marked as 25A, 25B and 25C depending on the placement and orientation of space 20 on the touch screen 16. Illustration 25A shows the space 20 in the top area of the touch screen, illustration 25C shows the space 20 in the bottom area of the touch screen and illustration 25B shows the space 20 on the right middle of the screen at a 45 degree angle. These illustrations are simplified representations of where a user may have his/her thumb of the same hand on the touch screen when holding the device in the same hand.

As shown in view 24, the space 20 is marked as 26A, 26B and 26C depending on the placement and orientation of space 20 on the touch screen 16. Illustration 26C shows the space 20 in the bottom right area of the touch screen 16, illustration 26B shows the space 20 near the middle area of the touch screen and illustration 26A shows the space 20 near the right of the screen at a 45 degree angle. These illustrations are simplified representations of where a user may have his/her index finger of the other hand when holding the device in one hand.

Views 22 and 24 illustrate the convenience and flexibility of capturing a print from the touch screen 16. As has been described earlier in capture logic 18, which of these areas, depending on a user preference, is temporarily marked on the display screen 14 by the capture logic just before capture of a print.

In addition the capture logic 18 in such a space 20 (illustration 25C) is also capable of marking the actual position of a finger or thumb as a guide 25D to a user on the touch screen space 20.

Alternatively as had been illustrated with the help of FIG. 2C, the capture sub-logic 18X would enable the finger or thumb to be placed on any part of the touch screen surface of the smart phone device.

Handheld Electronic Device 10

The sensor surface 20 is embedded in an electronic device 10 such as a smart phone with circuits and software having capture logic therein to facilitate capture of a thumbprint from the sensor surface, wherein the thumbprint is different than a fingerprint for use as a biometric sample.

Even though the embodiments herein are described preferably for a handheld device such as smart phone device 10, no limitations are intended to be placed or placed for use of the technology herein for other applications.

These other applications may include kiosks at airport that are used for traveler check-in. These kiosks have touch screen displays for entry of confirmation number etc. These kiosks enable a customer to be identified by insertion of a bankcard used for the purchase of the ticket, or entry of a confirmation number.

In addition such touch-screen displays may be adapted for identifying and or verifying a customer by their finger or thumb print on the touch screen surface that has been pre-identified on the screen.

Customer Setup Function 46

A customer using a customer setup function 46, as illustrated in FIG. 4A, would be able to setup the following aspects of a print capture for the embodiments herein.
1. Select hand, left or right
2. Select hand size, small, medium and large—optional
3. Select thumb or index finger of the hand
4. Select one or more of a sensor area choices displayed on the touch screen, where the sensor area has been pre-defined based on different ways, a smart phone device is held in the hand as well as positioning of finger or thumb for print capture, alternatively
5. Create a new sensor area that has not been pre-defined
6. Display the sensor area for final selection
7. Save the sensor area size and location for use in the capture logic 18.

Mode of Use for One Series of Embodiments
(FIGS. 1 to 5)

Figure 6:
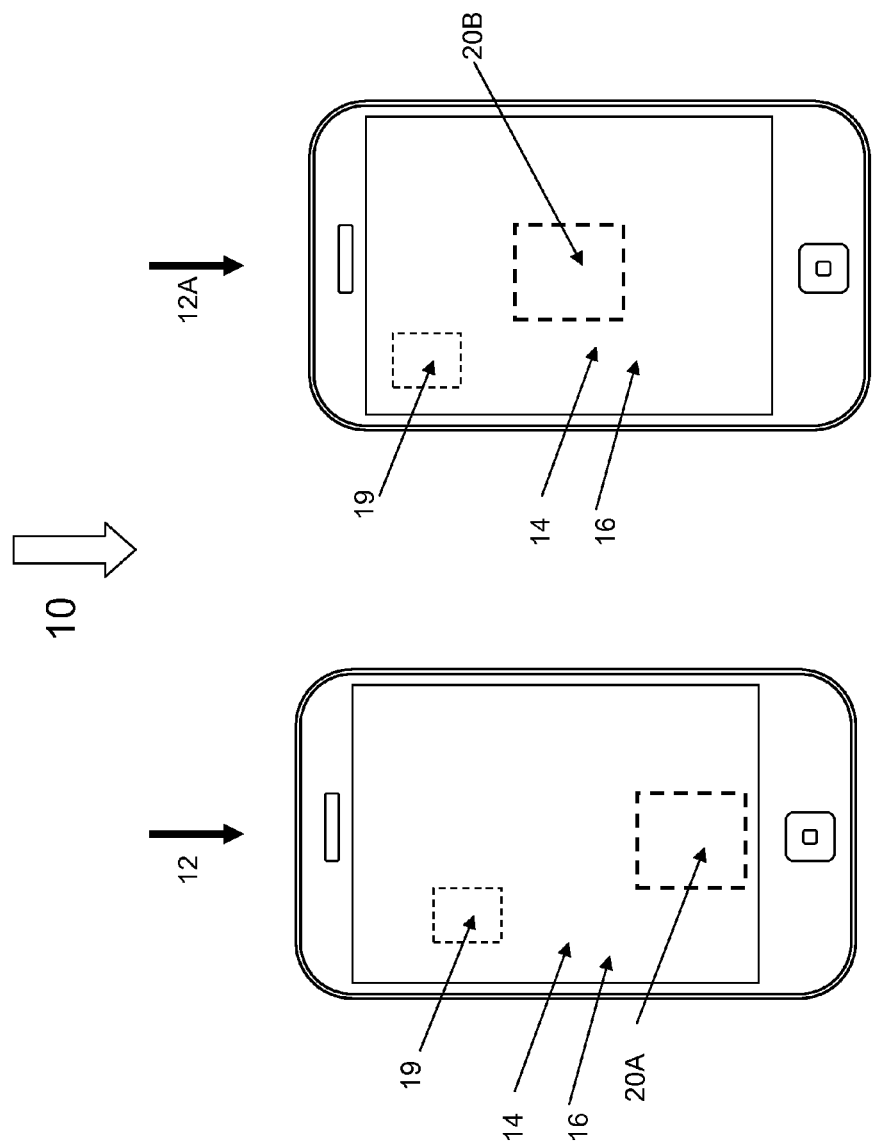
FIG. 6 is a diagram that illustrates features of the embodiments herein of a remote user authentication to a wireless network using a smart phone biometric sensor.

Customer Set Up
  Select thumb or finger
  Select left or right hand
  Select hand size
  Select sensor placement location and orientation on the screen
  Create a sample to be stored
  Application: Access to Smart Phone Device
  Turn device on
  Device screen displays sensor area
  Place finger on the sensor area
  Logic detects and captures print
  Logic compares with stored print
  Device unlocked for use Application: Use for Entry Gate Access
  Turn device on
  Device screen displays sensor area
  Place finger on the sensor area
  Logic detects and captures print
  Logic requires optionally input of PIN
  Logic creates and sends an authentication record to gate electronics by short distance wireless feature of the device
  Gate electronics verifies authentication record and opens the gate Mode of Use for Another Series of Embodiments
(FIGS. 6 and 7)

Customer Setup
  Select thumb or finger
  Select left or right hand
  Select hand size
  Select sensor placement location and orientation on the screen
  Application: Use for Entry Gate Access
  Turn device on
  Device screen displays sensor area
  Place finger on the sensor area
  Logic detects and captures print
  Logic requires input of PIN
  Logic creates and sends an authentication record to gate electronics by short distance wireless
  Gate electronics with the help of an authentication database verifies authentication record and issues a command that opens the gate
Application: Network Access (for Example Access to Secure Server Bank Site)
  Turn device on
  Device screen displays sensor area
  Place finger on the sensor area
  Logic detects and captures print
  Logic requires input of PIN
  Logic requires selection of network identification from a list that is to be accessed
  Logic sends record to network by wireless
  Logic receives approval of login access What have been described above are simplified illustrations of use of the smart phone device using the embodiments herein, where other modes of use are not ruled out.

Method of Operation

As illustrated in FIG. 4B, a method for a thumbprint sensor device has the following steps, where all the steps may not be used or used in the order specified.

At step 30, building a touch sensor surface with a surface area having a length and width dimension that would accommodate at least a placement of a human thumb flat on the sensor surface.

At step 32, embedding the sensor surface in an electronic device with circuits and software having a capture logic therein to facilitate capture of a thumbprint from the sensor surface, wherein the thumbprint is different than a fingerprint for use as a biometric sample.

At step 34, making the sensor surface area larger in one dimension relative to another dimension to match a footprint of a human thumb.

At step 36, activating the capture logic only when a thumb placement on the sensor surface is detected by the electronic device.

At step 38, computing a quality of print logic in the capture logic has that verifies the thumbprint capture and signifies collection of a good print by a beep and or a light on the device.

At step 40, making a surface orientation of the sensor surface relative to the electronic device facilitates thumbprint capture when the electronic device is held in the hand.

At step 42, making the surface area is at least ¾" by 1.25" to accommodate a thumbprint size.

At step 44, making the sensor surface a part of a touch screen of a mobile wireless communication device;

At step 46, marking the part of the touch screen soft or temporarily marked when the device is activated to indicate to a user the location of the sensor surface area for placing the thumb.

One-Way Function 60

Figure 5A:
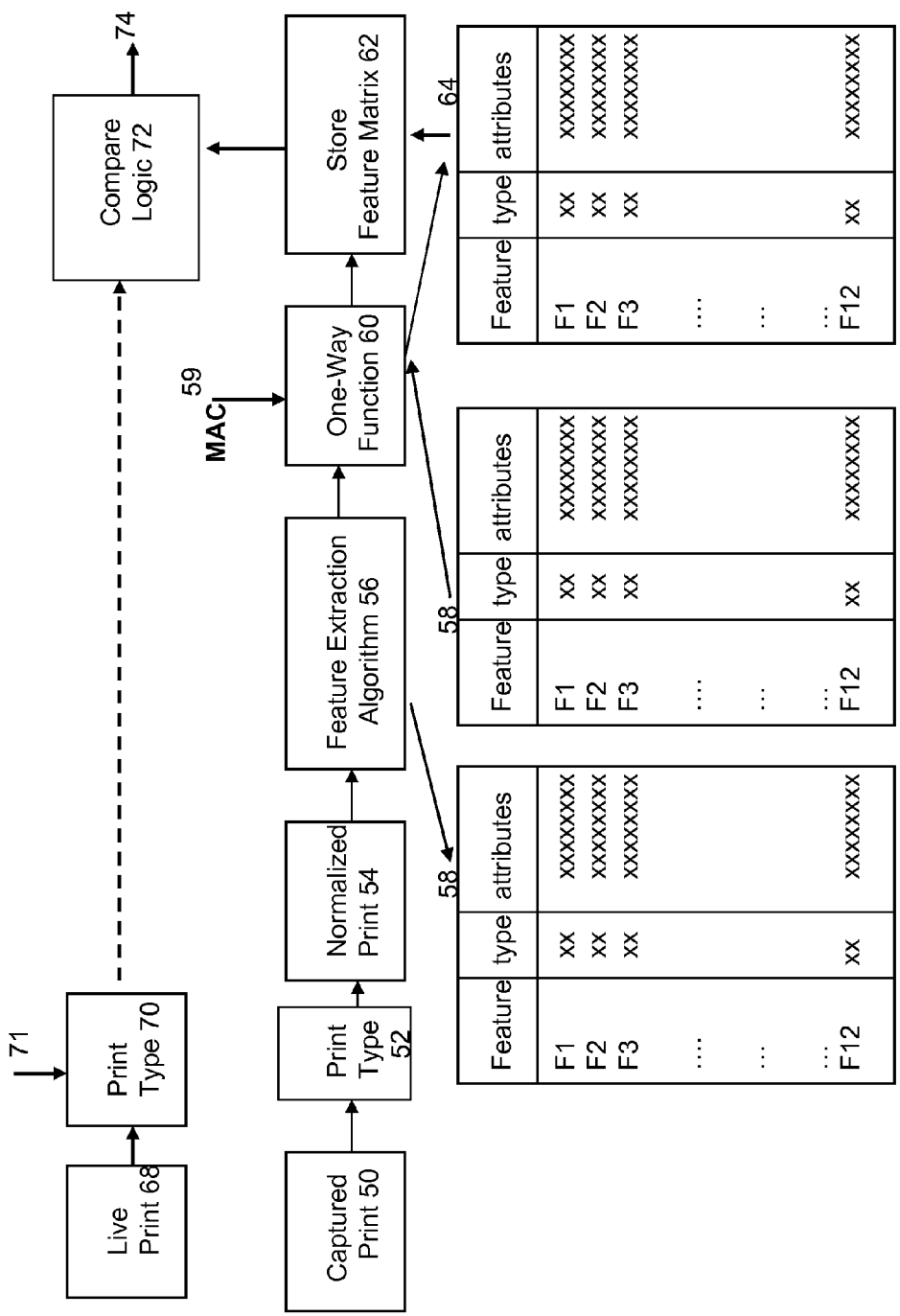
FIGS. 5A and 5B are diagrams that illustrate features of using a feature matrix and a one-way function in the embodiments herein of a smart phone biometric sensor.
Figure 5B:
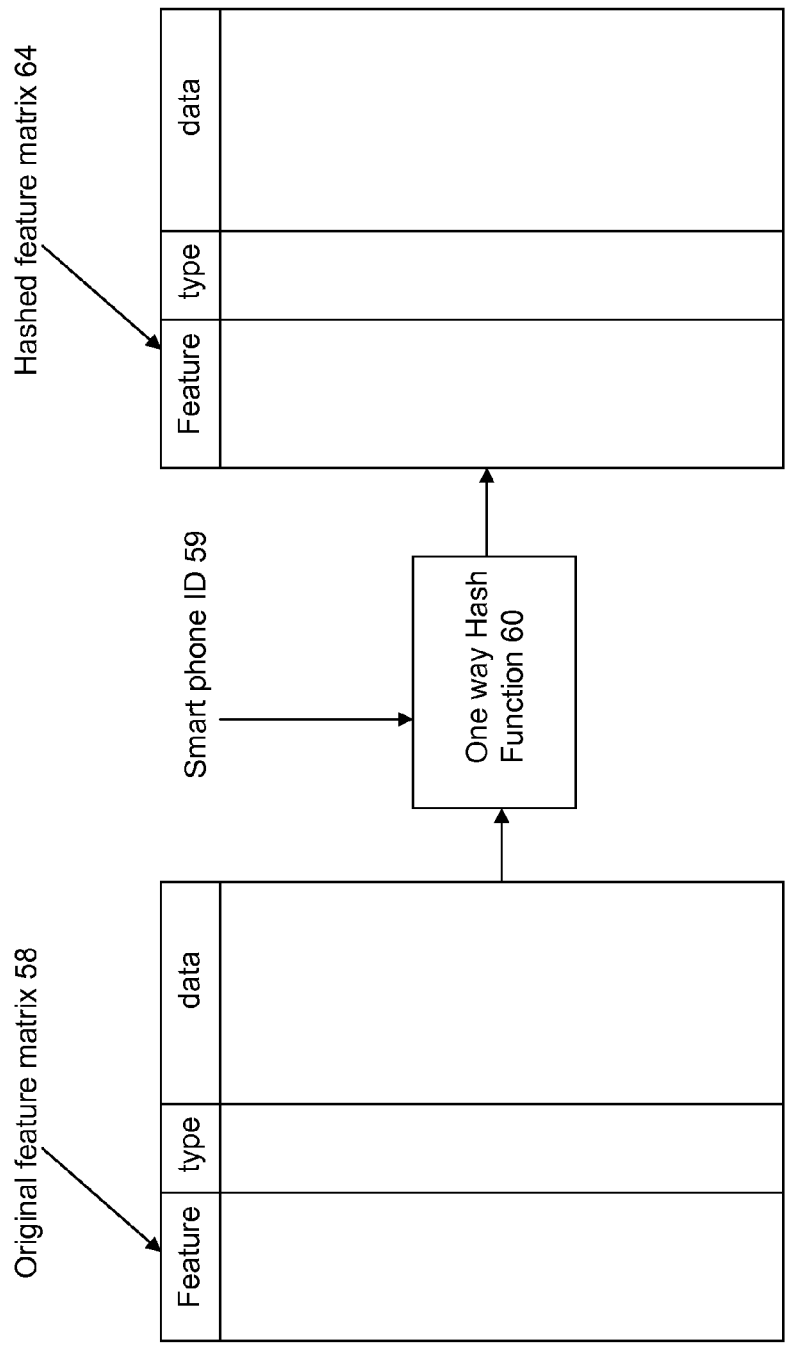

Use of one way function 60 and a feature matrix 58 is described with the help of FIGS. 5A and 5B for storing a fingerprint or thumbprint in the smart phone device that provides a degree of privacy and security assurance to a user. This security assurance is very important to a user for the reasons as described below.

Information security industry teaches three different factors of authentication, namely "what you have", "what you are", and "what you know". Of these three factors of remote user authentication, two of them, namely "what you have", and "what you know" can be recreated or replaced if they are compromised. However, the third factor that of "what you are", a biometric sample such as a fingerprint cannot be replaced likewise.

That is why users are reluctant to have their fingerprints stored in a database where it could be compromised. Therefore this fact of compromise from a database in the world of interconnected computers over a global network requires extra safeguard in the storage and safeguard of a fingerprint.

A solution to this issue of privacy and security of a fingerprint that cannot be provided by a storage means, even if encrypted, is illustrated with the help of FIGS. 5A and 5B.

As illustrated in FIG. 5A, for creating a sample, a print is captured using a print function 50, the print type parameter 52 are input, such as finger or thumb etc, the print is normalized by a normalization function 54, and then a feature extraction algorithm 56 is used to create a feature matrix 58.

The feature matrix 58 is input to a one-way function 60. The one-way function 60 inputs machine address code (MAC) 59 of the device and outputs an encrypted feature matrix 64. The storage function 62 stores the one-way function encrypted feature matrix 64 in the memory of the device.

After a biometric sample had been so collected, processed and saved, a user helps collect a live print 68, print type 71 by type function 70 is collected and the print is processed through the various processes described earlier and sent to compare logic 72, which compares to the features of the stored feature matrix 64 to create a pass/fail result 74.

FIG. 5B illustrates use of a feature matrix 58 and a one way function 60 to safeguard the feature matrix 58 from compromise. A feature matrix 58 and creation of a feature matrix 58 is prior art. Such feature matrix, it is believed, are used by FBI to compare and search for a single print from a large database of prints.

A feature matrix 58 stores identification of each feature, its type and corresponding data. As a simplified illustration those who are knowledgeable in the science of fingerprints have categorized various features such as swirls, whorls etc and where each feature is characterized as a unique dataset.

A one-way hash function 60 may take each feature of the feature matrix 58 and hash it using the one-way hash function to create a hashed feature matrix 64, where the data corresponding to each feature has been hashed. Hashing or a one way-function is prior art and is commonly used in creation of a digital id and for protection of passwords during storage. In the specific use in the embodiments herein, the hash function is customized to each smart phone device by using the smart phone ID 59.

Thus the hashed feature matrix 64 can only be used by this device and also cannot be reverse engineered to recreate the original fingerprint. The use of a one-way function and hash algorithm, it is believed, would provide a degree of security assurance to the users who generally are reluctant for giving and storing their fingerprints in a database. Such security assurance safeguards would allow much more widespread use of the fingerprints or thumbprints in other applications.

With reference to FIGS. 6 and 7, the print capture logic 19 as had been described in the prior application Ser. No. 11/520,201, now U.S. Pat. No. 8,090,945, is used and is incorporated herein by reference.

Figure 8:
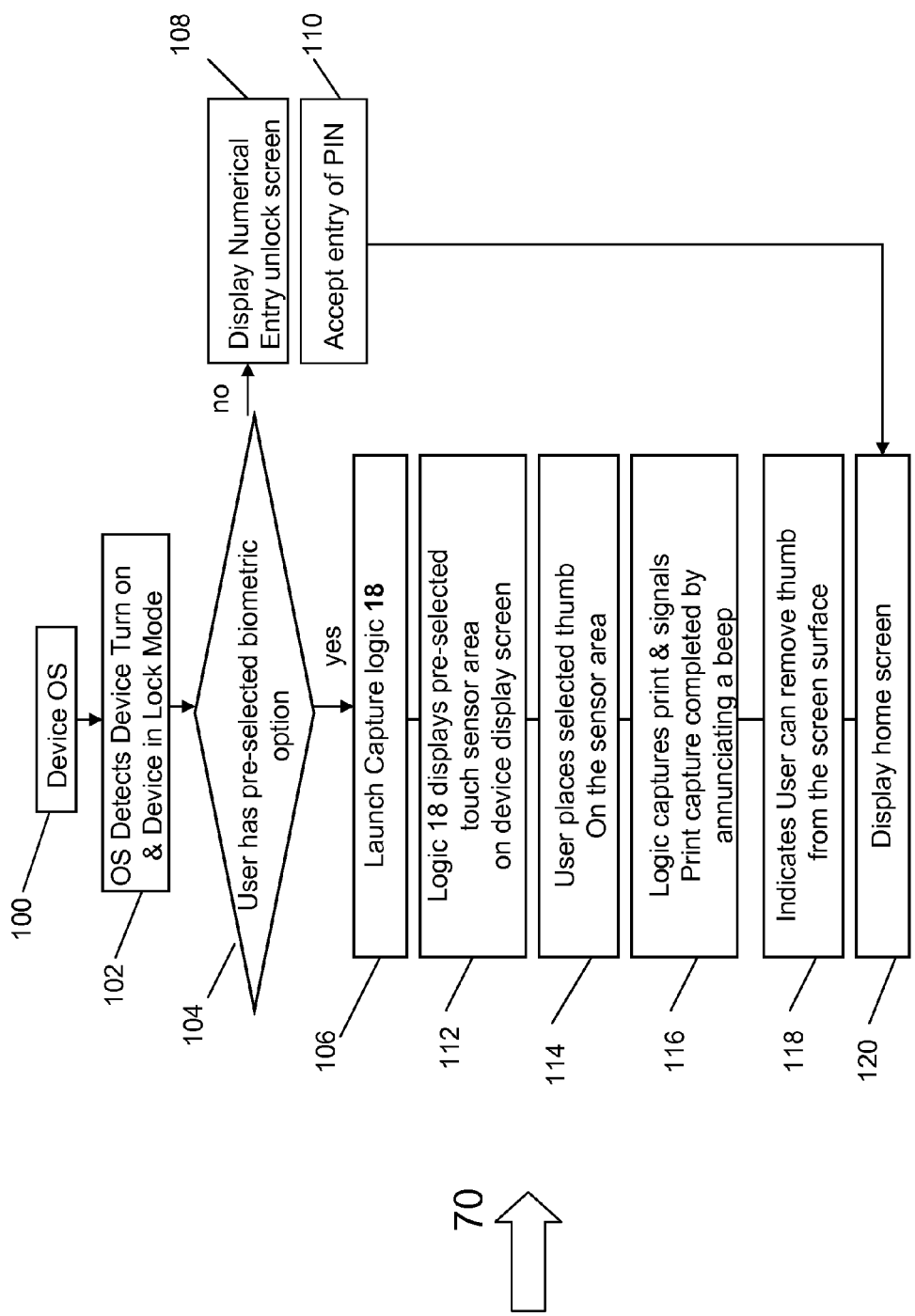
FIG. 8 is a logic diagram that illustrates features of the embodiments herein of a smart phone biometric sensor, for a smart phone device.
Figure 9:
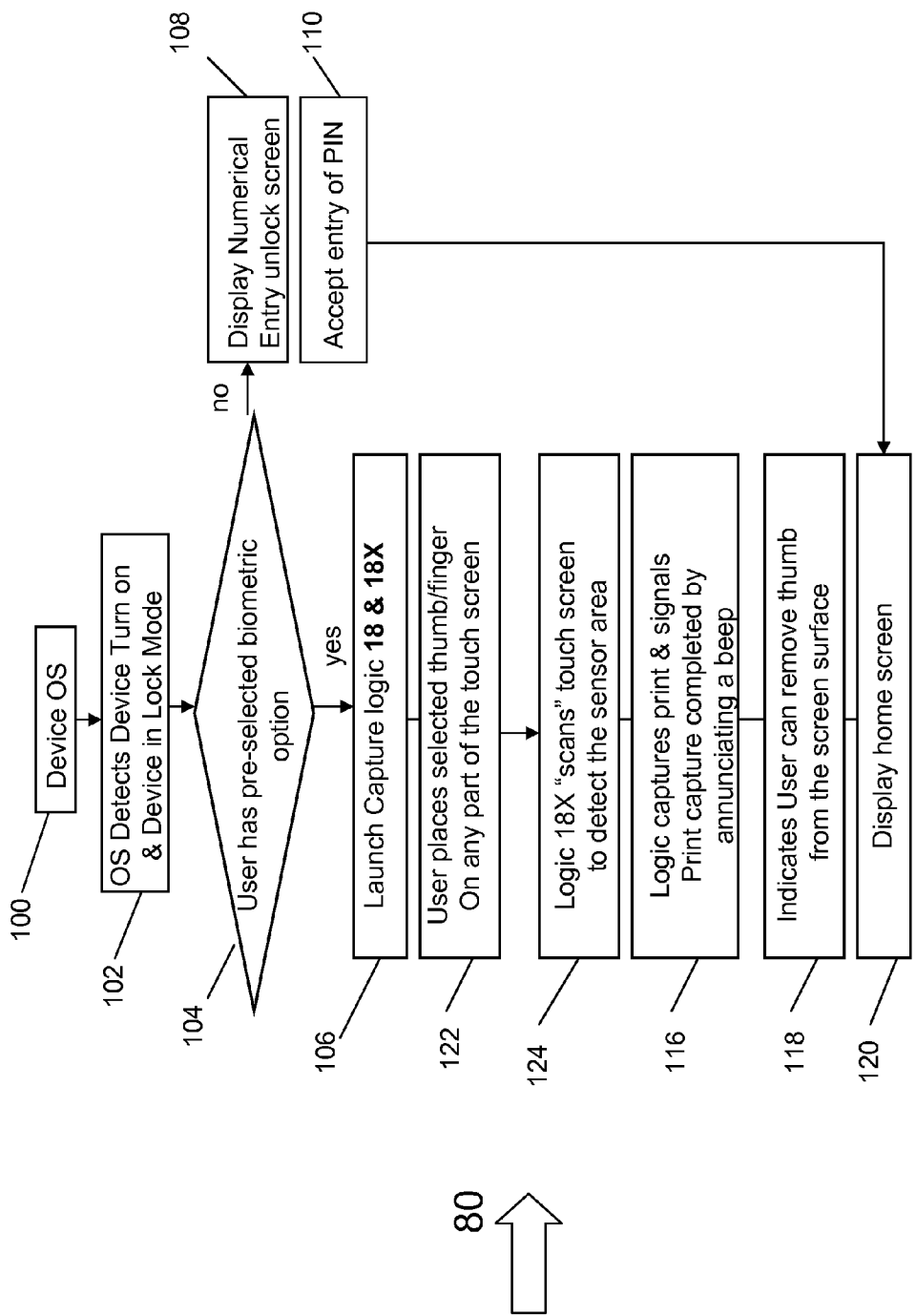
FIG. 9 is a logic diagram that illustrates features of the embodiments herein of a smart phone biometric sensor, for a smart phone device.
Figure 10:
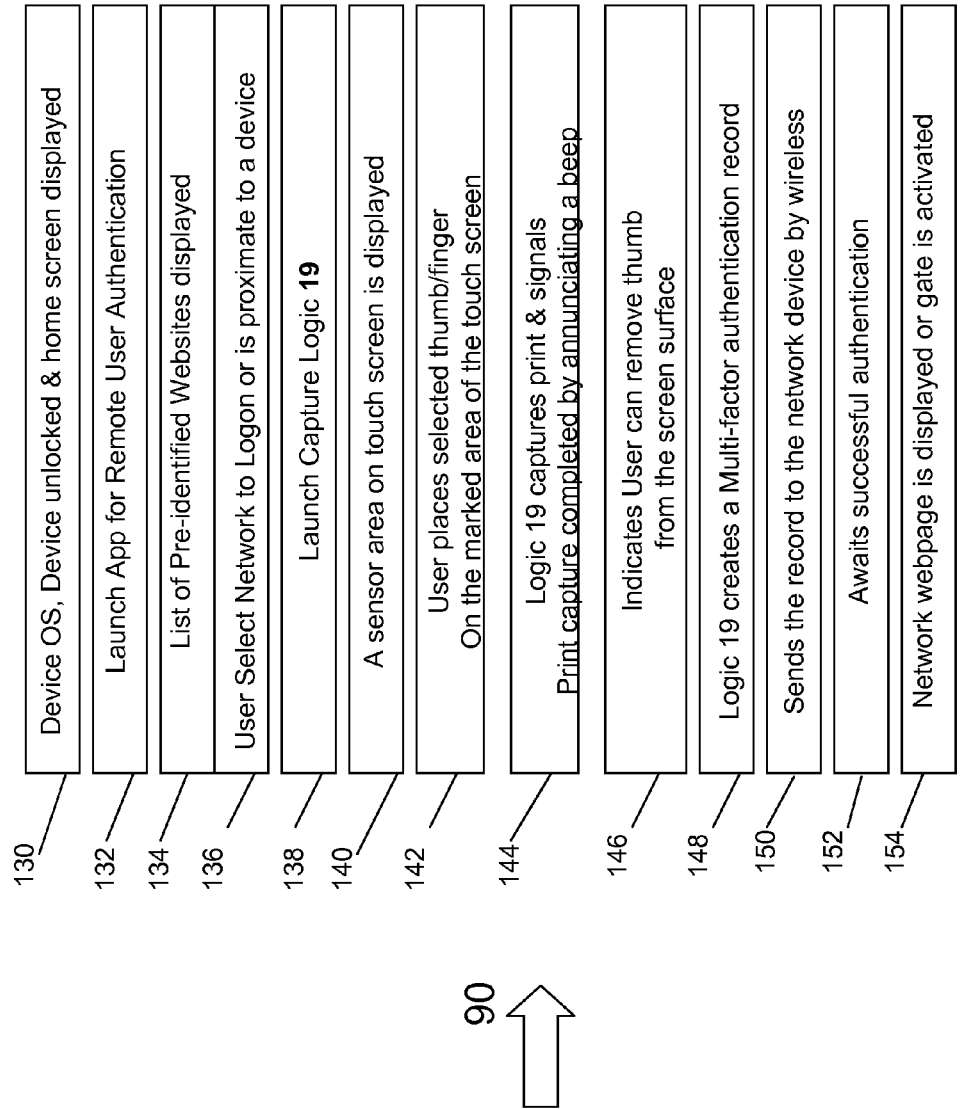
FIG. 10 is a logic diagram that illustrates features of the embodiments herein of a smart phone sensor, for use as a remote user authentication device.

With reference to FIGS. 8, 9 and 10 preferred embodiments 70, 80 and 90 are further illustrated. In embodiment 70, the user pre-selects an area of the touch screen for capturing a biometric sample as part of a customer setup function for unlocking the device.

In embodiment 80, the user does not pre-select an area of the touch screen as part of a customer setup function; instead the entire screen may be used to capture a thumbprint or fingerprint.

In embodiment 90, the user selects an area of the touch screen as part of a customer setup function, and selects the network he/she wishes to be authenticated to.

With reference to FIG. 8, where all the steps may not be used or used in the order specified:

At step 100, device OS is used; at step 102, OS detects device turn on & device in lock mode; at step 104, user has pre-selected biometric option; at step 108, if option not selected, display numerical entry unlock screen; at step 110, accept entry of PIN; at step 104, if biometric option is pre-selected; at step 106, launch capture logic 18; at step 112, logic 18 displays pre-selected touch sensor area, on device display screen; at step 114, user places selected thumb on the sensor area; at step 116, logic captures print & signals print capture completed by annunciating a beep Indicates; at step 118, user can remove thumb from the screen surface; and at step 120, display home screen.

With reference to FIG. 9, where all the steps may not be used or used in the order specified:

At step 100, device OS is used; at step 102, OS detects device turn on & device in lock mode; at step 104, user has pre-selected biometric option; at step 108, if option not selected, display numerical entry unlock screen; at step 110, accept entry of PIN; at step 104, if biometric option is pre-selected; at step 106, launch capture logic 18 and 18X; at step 122, user places selected thumb/finger on any part of the touch screen; at step 124, logic 18X "scans" touch screen to detect the sensor area; at step 116, logic captures print & signals print capture completed by annunciating a beep Indicates; at step 118, user can remove thumb from the screen surface; and at step 120, display home screen.

With reference to FIG. 10, where all the steps may not be used or used in the order specified:

At step 130, device OS, device unlocked & home screen displayed; at step 132, launch App for Remote User Authentication; at step 134, list of pre-identified websites displayed; at step 136, user selects network to login or is proximate to a network device such as a laptop computer or an entry gate; at step 138, launch capture logic 19; at step 140, a sensor area on touch screen is displayed; at step 142, user places selected thumb/finger on the marked area of the touch screen; at step 144, logic 19 captures print & signals print capture completed by annunciating a beep; at step 146, indicates user can remove thumb from the screen surface; at step 148, logic 19 creates a multi-factor authentication record; at step 150, sends the record to the network device or points to a device such as a laptop computer or an entry gate; at step 152, device awaits successful authentication; at step 154, network webpage is displayed or the gate is activated.

A mobile wireless communication device has a display screen overlaid by a touch screen and a processor and a memory in the device hosting functions to perform display and touch control functions of the device. The touch screen is of type that has a grid of capacitive elements and uses mutual capacitance technology and simultaneously detects multiple touch points on the touch screen using fingers. A capture logic resident in the memory and the processor of the device, the capture logic is programmed to use a part or any part of the touch screen as a biometric fingerprint sensor to collect a biometric sample.

The capture logic sets aside a space on the touch screen for that specific space to function as the biometric sensor. The biometric sensor configured to use and uses either a finger of the hand or a thumb and thus captures either a fingerprint or a separate and distinct thumbprint, where a fingerprint and a thumbprint are different biometric samples.

The capture logic has a sub-logic A that is activated by a switch activation, marks and displays a pre-specified area via the display screen of the touch screen for capturing a fingerprint and displays instructions for use—place thumb flat anywhere on the specific marked area. The logic A creates a collection timer waits for collection time expiration, during the time detects gross touch over at least a threshold area of the specified area, and activates a sub-logic B to begin capture of capacitor grid charge data matrix for the specific area and that collects a biometric sample.

The logic has a sub-logic C that (i) computes quality threshold indicator and annunciates good collection by light or beep or both annunciation in the device and (ii) creates a feature matrix from the charge data matrix. The logic has a sub-logic D, that compares the feature matrix with stored sample, makes a decision and conveys results to sub-logic E. The sub-logic E unwinds logic A, B, C and D and launches device specific processing.

The logic additionally requires input of a PIN using touch screen, uses the PIN to create an encryption key, encrypts the biometric sample and wirelessly transmits an authentication record with the encrypted sample along with a device identifier to a network device. The logic additionally includes in the wirelessly transmitted authentication record a GPS location data and a time of use from the device to the network device.

A thumbprint sensor device has a touch sensor surface with a surface area having a length and width dimension that would accommodate at least a placement of a human thumb flat on the sensor surface. The sensor surface is embedded in an electronic device with circuits and software having a capture logic therein to facilitate capture of a thumbprint from the sensor surface, wherein the thumbprint is different than a fingerprint for use as a biometric sample.

The capture logic activated only when a thumb placement on the sensor surface is detected by the electronic device. The capture logic has quality of print logic that verifies the thumbprint capture and signifies collection of a satisfactory print by a beep and or a light on electronic the device.

The logic provides a surface orientation of the sensor surface relative to the electronic device facilitates thumbprint capture when the electronic device is held in the hand. The surface area is at least ¾" by 1.25" to accommodate a thumbprint size. The sensor surface is a part of a touch screen of a mobile wireless communication device. The part of the touch screen is soft marked when the device is turned on to indicate to a user the location of the sensor surface area for placing the thumb.

A method for thumbprint sensor device has the steps where all the steps many not be used or used in the order specified:

a. building a touch sensor surface with a surface area having a length and width dimension that would accommodate at least a placement of a human thumb flat on the sensor surface.

b. embedding the sensor surface in an electronic device with circuits and software having capture logic therein to facilitate capture of a thumbprint from the sensor surface, wherein the thumbprint is different than a fingerprint for use as a biometric sample.

c. making the sensor surface area larger in one dimension relative to another dimension to match a footprint of a human thumb.

d. activating the capture logic only when a thumb placement on the sensor surface is detected by the electronic device.

e. computing a quality of print logic in the capture logic has that verifies the thumbprint capture and signifies collection of a good print by a beep and or a light on the device.

f. making a surface orientation of the sensor surface relative to the electronic device facilitates thumbprint capture when the electronic device is held in the hand.

g. making the surface area is at least ¾" by 1.25" to accommodate a thumbprint size.

h. making the sensor surface a part of a touch screen of a mobile wireless communication device.

i. marking the part of the touch screen soft marked when the device is powered to indicate to a user the location of the sensor surface area for placing the thumb.

In summary, the preferred embodiments are for a smart phone device that has a display screen overlaid by a touch screen and a processor and a memory in the device hosting functions to perform display and touch functions.

A logic executing in the processor in the device programmed to use a part of the touch screen as a biometric sensor. The logic sets aside a space on the touch screen for that specific space to function as the biometric sensor.

The biometric sensor is configured to use and uses either a finger of the hand or a thumb and thus captures either a fingerprint or a separate and distinct thumbprint, where a fingerprint and a thumbprint are different biometric samples.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A mobile wireless communication device, comprising:
a handheld device, wherein the handheld device is of a type of a smart phone or a tablet computer, the device has a top side and a bottom side, the topside has a display screen for displaying images and a touch screen that is overlaid over the display screen, and wherein the touch screen simultaneously detects multiple finger touch points, using a capacitive touch sense, for touch control of the device's operations;

the device has a processor and a memory and a biometric capture logic stored in the memory and executing in the processor, wherein the biometric capture logic, when activated in the device, causes a temporary display of a touch area, wherein the touch area is displayed on any part of the touch screen that has been pre-selected by a user and visually identifies a space on that part of the touch screen; and the biometric capture logic, when the user's thumb pad or the finger pad is positioned flat on the touch area, detects a gross touch on the touch area, when the aggregate electrical charge collected from the gross touch exceeds a threshold;

the biometric capture logic, when the aggregate charge of the gross touch exceeds the threshold, the biometric capture logic collects a biometric sample of the fingerprint or the thumbprint of a user in the form of a grid of electrical charge values representative of the fingerprint or the thumbprint from the touch area of the part of the touch screen itself.

2. The device as in claim 1, comprising:
a. the capture logic sets aside a space on the touch screen for that specific space to function as the biometric sensor;
b. the biometric sensor configured to use and uses either a finger of the hand or a thumb and thus captures either a fingerprint or a separate and distinct thumbprint, where a fingerprint and a thumbprint are different biometric samples.

3. The device as in claim 1, comprising:
a. the capture logic has a sub-logic A that is activated by a switch activation, marks and displays a pre-specified area via the display screen of the touch screen for capturing a fingerprint and displays instructions for use—place thumb flat anywhere on the specific marked area;
b. the logic A creates a collection timer waits for collection time expiration, during the time detects gross touch over at least a threshold area of the specified area, and activates a sub-logic B to begin capture of capacitor grid charge data matrix for the specific area and that collects a biometric sample.

4. The device as in claim 3, comprising:
the logic has a sub-logic C that (i) computes quality threshold indicator and annunciates good collection by light or beep or both annunciation in the device and (ii) creates a feature matrix from the charge data matrix.

5. The device as in claim 4, comprising:
a. the logic has a sub-logic D, that compares the feature matrix with a stored feature matrix, makes a decision and conveys results to sub-logic E;
b. sub-logic E unwinds logic A, B, C and D and launches device specific processing.

6. The device as in claim 1, comprising:
the logic additionally requires input of a PIN using touch screen, uses the PIN to create an encryption key, encrypts the biometric sample and wirelessly transmits an authentication record with the encrypted sample along with a device identifier to a network device.

7. The device as in claim 6, comprising:
the logic additionally includes in the wirelessly transmitted authentication record a GPS location data and a time of use from the device to the network device.

8. A thumbprint biometric sensor device comprising:
an electronic device with a CPU and a memory and a display screen that displays images and wherein the display screen is overlaid with a touch screen with a grid of capacitive touch points, wherein the touch screen simultaneously detects multiple touch points, and wherein the grid density of the capacitive touch points is substantially 250 pixels per inch;
a biometric capture logic stored in the memory and executing in the CPU causes a temporary display on the display screen a marked surface area, wherein the location of the marked surface area on the touch screen is user selectable and having a length and width dimension that accommodates at least a placement of a human thumb flat on the marked surface area to facilitate capture of a thumbprint from the marked surface area;
the capture logic detects a gross touch on any part of the marked surface area, based on the gross touch exceeding an energy threshold, when the user's thumb pad is positioned flat on the marked surface area and a duration of the touch exceeding a time threshold, wherein the biometric capture logic using the placement of the thumb on the marked surface area collects a thumbprint biometric sample in the form of a grid of capacitance charge values.

9. The device as in claim 8, comprising:
the capture logic activated only when a thumb placement on the sensor surface is detected by the electronic device.

10. The device as in claim 9, comprising:
the surface area is at least ¾" by 1.25" to accommodate a thumbprint size.

11. The device as in claim 9, comprising:
a. the sensor surface is a part of a touch screen of a mobile wireless handheld communication device;
b. the part of the touch screen is soft marked when the device is turned on to indicate to a user the location of the sensor surface area for placing the thumb.

12. The device as in claim 8, comprising:
the capture logic has quality of print logic that verifies the thumbprint capture and signifies collection of a satisfactory print by a beep and or a light on electronic the device.

13. The device as in claim 8, comprising:
a surface orientation of the sensor surface relative to the electronic device facilitates thumbprint capture when the electronic device is held in the hand.

14. A method for thumbprint biometric sensor device comprising the steps of:
providing an electronic device with a CPU and a memory and a display screen for displaying images overlaid with a touch screen with a grid of capacitive touch points, wherein the touch screen simultaneously detects multiple touch points, and wherein the grid density of the capacitive touch points is substantially 250 pixels per inch;
storing in the memory and executing in the CPU a biometric capture logic, displaying by the capture logic on the display screen a marked surface area, wherein the location of the marked surface area on the touch screen is user selectable and having a length and width dimension that accommodates at least a placement of a human thumb flat on the marked surface area to facilitate capture of a thumbprint from the marked surface area;
detecting by the capture logic a gross touch on any part of the marked surface area, based on the gross touch exceeding an energy threshold, when the user's thumb pad is positioned flat on the marked surface area and a duration of the touch exceeding a time threshold, wherein the biometric capture logic using the placement of the thumb on the marked surface area collects a thumbprint biometric sample in the form of a grid of capacitance charge values.

15. The method as in claim 14, comprising the steps of:
providing the sensor surface area larger in one dimension relative to another dimension to match a size of a human thumb.

16. The method as in claim 14, comprising the steps of:
activating the capture logic only when a thumb placement on the sensor surface is detected by the electronic device.

17. The method as in claim 14, comprising the steps of:
computing a quality of print logic in the capture logic has that verifies the thumbprint capture and signifies collection of a good print by a beep and or a light on the device.

18. The method as in claim 14, comprising the steps of:
providing a surface orientation of the sensor surface relative to the electronic device facilitates thumbprint capture when the electronic device is held in the hand.

19. The method as in claim 14, comprising the steps of:
providing the surface area is at least ¾" by 1.25" to accommodate a thumbprint size.

20. The method as in claim 14, comprising the steps of:
a. providing the sensor surface as a part of a touch screen of a mobile wireless communication device;
b. marking the part of the touch screen temporarily marked or soft marked when the device is turned on to indicate to a user the location of the sensor surface area for placing the thumb.

\* \* \* \* \*